US012755859B2

(12) United States Patent
Wang et al.

(10) Patent No.: US 12,755,859 B2
(45) Date of Patent: Oct. 6, 2026

(54) PEROVSKITE-ORGANIC CHROMOPHORE BASED X-RAY IMAGINING SCINTILLATOR

(71) Applicant: KING ABDULLAH UNIVERSITY OF SCIENCE AND TECHNOLOGY, Thuwal (SA)

(72) Inventors: Jian-Xin Wang, Thuwal (SA); Omar F. Mohammed, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 169 days.

(21) Appl. No.: 18/706,028

(22) PCT Filed: Oct. 31, 2022

(86) PCT No.: PCT/IB2022/060479
§ 371 (c)(1),
(2) Date: Apr. 30, 2024

(87) PCT Pub. No.: WO2023/073662
PCT Pub. Date: May 4, 2023

(65) Prior Publication Data

US 2025/0014774 A1 Jan. 9, 2025

Related U.S. Application Data

(60) Provisional application No. 63/274,139, filed on Nov. 1, 2021.

(51) Int. Cl.
*A61B 6/00* (2024.01)
*C09K 11/06* (2006.01)
(Continued)

(52) U.S. Cl.
CPC ................ *G21K 4/00* (2013.01); *C09K 11/06* (2013.01); *C09K 11/665* (2013.01); (Continued)

(58) Field of Classification Search
CPC ................................ G01T 1/20; G01T 1/2033
See application file for complete search history.

(56) References Cited

U.S. PATENT DOCUMENTS

2017/0322323 A1* 11/2017 Fischer ................. G01T 1/2006
2020/0255724 A1 8/2020 Mohammed et al.
2021/0171828 A1 6/2021 Liu et al.

FOREIGN PATENT DOCUMENTS

WO 2021090167 A1 5/2021

OTHER PUBLICATIONS

Hajagos, "High-Z Sensitized Plastic Scintillators: A Review," Lawrence Livermore National Laboratory, LLNL-JRNL-781719, Jul. 17, 2019. (Year: 2019).*

(Continued)

*Primary Examiner* — Dani Fox
(74) *Attorney, Agent, or Firm* — PATENT PORTFOLIO BUILDERS PLLC

(57) ABSTRACT

An X-ray imagining film that transforms X-ray radiation into visible light by scintillating, includes a substrate and a nanocomposite formed on the substrate. The nanocomposite includes perovskite nanosheets and plural organic chromophores that interact with the perovskite nanosheets through F—Pb bonds. The perovskite nanosheets are selected to absorb the X-ray radiation and emit first light centered on 510 nm, and the plural organic chromophores are selected to absorb second light between 400 and 600 nm, with a peak at 510 nm, and emit the visible light in 500 to 800 nm range.

20 Claims, 16 Drawing Sheets

(51) Int. Cl.
*C09K 11/66* (2006.01)
*G21K 4/00* (2006.01)
*G01T 1/20* (2006.01)

(52) U.S. Cl.
CPC ........ *C09K 2211/1088* (2013.01); *G01T 1/20* (2013.01); *G21K 2004/10* (2013.01)

(56) References Cited

OTHER PUBLICATIONS

Wang, "Perovskite-Nanosheet Sensitizer for Highly Efficient Organic X-ray Imaging Scintillator," ACS Publications, Published Nov. 27, 2021. (Year: 2021).*
Ding, D., et al., "Highly Efficient and Color-Stable Thermally Activated Delayed Fluorescence White Light-Emitting Diodes Featured with Single-Doped Single Emissive Layers," Advanced Materials, Jan. 28, 2020, 3vol. 2, No. 1906950, pp. 1-8, WILEY-VCH Verlag Gmbh & Co. KGaA, Weinheim.
Gandini, M., et al., "Efficient, Fast and Reabsorption-Free Perovskite Nanocrystal-based Sensitized Plastic Scintillators," Nature Nanotechnology, Jun. 2020, vol. 15, pp. 462-468.
Hirata, S., et al., "Highly Efficient Blue Electro-luminescence based on Thermally Activated Delayed Fluorescence," Nature Materials, Dec. 8, 2014, vol. 14, pp. 330-336, Macmillan Publishers Limited.
International Search Report in corresponding/related International Application No. PCT/IB2022/060479, date of mailing Jan. 17, 2023.
Jeon, S.O., et al., "High-Efficiency, Long-Lifetime Deep-Blue Organic Light-Emitting Diodes," Nature Photonics, Feb. 15, 2021, vol. 15, pp. 208-215.
Luo, D., et al., "Extremely Simplified, High-Performance, and Doping-Free White Organic Light-Emitting Diodes Based on a Single Thermally Activated Delayed Fluorescent Emitter," ACS Energy Letters, Jun. 7, 2018, vol. 3, pp. 1531-1538.
Patalag, L.J., et al., "Ultrafast Resonance Energy Transfer in Ethylene-Bridged BODIPY Heterooligomers: From Frenkel to Forster Coupling Limit," Journal of the American Chemical Society, May 6, 2021, vol. 143, pp. 7414-7425, ACS Publications.
Sun, J., et al., "Charge-Transfer Exciton Manipulation Based on Hydrogen Bond for Efficient White Thermally Activated Delayed Fluorescence," Advanced Functional Materials, Dec. 29, 2019, vol. 30, pp. 1908568 1-13. WILEY-VCH GmbH & Co. KGaA, Weinheim.
Wang, J.-X., et al., "Organic Composite Crystal with Persistent Room-Temperature Luminescence Above 650 nm by Combining Triplet-Triplet Energy Transfer with Thermally Activated Delayed Fluorescence," CCS. Chemistry, Aug. 18, 2020, vol. 2, Issue 5, pp. 1391-1398.
Written Opinion of the International Searching Authority in corresponding/related International Application No. PCT/IB2022/060479, date of mailing Jan. 17, 2023.
Xu, L.-J., et al., "Highly Efficient Eco-Friendly X-ray Scintillators based on an Organic Manganese Halide," Nature Communications, Aug. 28, 2020, vol. 11, No. 4329, pp. 1-7.
Yang, J., et al., "Achieving Efficient Phosphorescence and Mechanoluminescence in Organic Host-Guest System by Energy Transfer," Advanced Function Materials, Sep. 23, 2021, vol. 31, Issue 52, pp. 2108072 1-8, Wiley-VCH GmbH.
Yang, Z., et al., "Recent Advances in Organic Thermally Activated Delayed Fluorescence Materials," Chemical Society Review, Jan. 24, 2017, vol. 46, pp. 915-1016, RCS Publishing.
Zeng, Y., et al., "Molecular-Supramolecular Light Harvesting for Photochemical Energy Conversion: Making Every Photon Count," ACS Energy Letters, Jan. 6, 2017, vol. 2, No. 2, pp. 357-363, ACS Publications.
Zheng, B., et al., "Near-Infrared Photosensitization via Direct Triplet Energy Transfer from Lanthanide Nanoparticles," Chem, Jun. 10, 2021, vol. 7, 1615-1625, Elsevier Inc.

* cited by examiner

PEROVSKITE-ORGANIC CHROMOPHORE BASED X-RAY IMAGINING SCINTILLATOR

CROSS-REFERENCE TO RELATED APPLICATIONS

This application is a U.S. National Stage Application of International Application No. PCT/IB2022/060479, filed on Oct. 31, 2022, which claims priority to U.S. Provisional Patent Application No. 63/274,139, filed on Nov. 1, 2021, entitled "SENSITIZED PEROVSKITE NANOSHEET FOR HIGHLY EFFICIENT ORGANIC X-RAY IMAGING SCINTILLATOR," the disclosures of which are incorporated herein by reference in their entirety.

BACKGROUND

Technical Field

Embodiments of the subject matter disclosed herein generally relate to a perovskite-nanosheet sensitizer for highly efficient organic X-ray imaging scintillator, and more particularly, to an efficient and reabsorption-free organic scintillator that includes perovskite nanosheets and an organic chromophore with thermally activated delayed fluorescence character.

Discussion of the Background

The fast-rising demand for the detection of ionizing radiation in a variety of technological and scientific fields, including medical radiography, security screening, and high-energy physics, has led to extensive research on X-ray imagining scintillators and detections. A scintillator is a material or combination of materials that is capable of transforming the received X-ray radiation into visible or near-infrared light. Thus, such a material is mainly used for X-ray imaging. However, high-performance scintillators consist mainly of either a ceramic material that needs harsh and costly preparation conditions or perovskite materials that have poor air and light stability along with high toxicity.

Organic scintillators, on the other hand, are an excellent alternative due to their good processability and stability. However, their low X-ray absorption cross-section always leads to low imaging resolution and poor detection sensitivity, which highly limits their progressive evolution and future commercialization. Therefore, searching for new but effective strategies to improve the performance of organic scintillation materials is of great interest to material scientists, chemists, and engineers.

In this regard, various groups [1-5] have tried the fabrication of efficient X-ray harvesting systems by using an efficient X-ray absorber material as the antenna and an organic chromophore as the luminescent center, which is a promising approach to fabricate high-performance organic-based X-ray imaging scintillators. To successfully implement such an X-ray harvesting strategy, the X-ray absorber materials and the organic chromophores (luminescent center) need to meet several strict criteria. First, the X-ray absorbers should contain enough high-atomic-number (Z) elements to guarantee their high X-ray absorption cross-section. Second, a relatively strong interaction between the two components (X-ray absorber and organic chromophore) is required, to ensure a short distance between their molecules, for an efficient energy transfer process. Third, a sufficient spectral overlap between the X-ray absorber and the organic chromophore is required to provide the essential prerequisite for fast and efficient energy transfer [6]. And fourth, the best organic chromophores to use are those for which the singlet and triplet state energies are simultaneously excited [7-13] because 25% of the excitons that are formed from electron-hole recombination are singlet states, while the remaining 75% are triplet states. Thus, thermally activated delayed fluorescence (TADF) chromophores [7-13] are one of the best candidates for the luminescent center due to their minimized singlet-triplet energy gap. This allows them to harness both singlet and triplet excitons for light emission through highly efficient spin up-conversion from the nonradiative triplet states to radiative singlet states.

Therefore, there is a need of new material systems for X-ray imagining scintillators with high X-ray sensitivity and imaging resolution.

BRIEF SUMMARY OF THE INVENTION

According to an embodiment, there is an X-ray imagining film that transforms X-ray radiation into visible light by scintillating. The X-ray imagining film includes a substrate and a nanocomposite formed on the substrate. The nanocomposite includes perovskite nanosheets and plural organic chromophores that interact with the perovskite nanosheets through F—Pb bonds. The perovskite nanosheets are selected to absorb the X-ray radiation and emit first light centered on 510 nm, and the plural organic chromophores are selected to absorb second light between 400 and 600 nm, with a peak at 510 nm, and emit the visible light in 500 to 800 nm range.

According to another embodiment, there is a nanocomposite that transforms X-ray radiation into visible light by scintillating. The nanocomposite includes perovskite nanosheets and plural organic chromophores. The plural organic chromophores interact with the perovskite nanosheets through F—Pb bonds. The perovskite nanosheets are selected to absorb the X-ray radiation and emit first visible light waves centered on 510 nm, and the plural organic chromophores are selected to absorb second light waves between 400 and 600 nm, with a peak at 510 nm, and emit the visible light between 500 to 800 nm.

According to yet another embodiment, there is an X-ray imagining system that transforms incoming X-ray radiation into visible light. The X-ray imagining system includes an X-ray source configured to generate first X-rays and an X-ray imagining film configured to receive second X-rays that have passed through a target and to generate an image of the target by transforming the second X-rays into the visible light by scintillation. The X-ray imagining film includes a substrate and a nanocomposite formed on the substrate. The nanocomposite includes perovskite nanosheets and plural organic chromophores that interact with the perovskite nanosheets through F—Pb bonds. The perovskite nanosheets are selected to absorb the second X-ray radiation and emit first light waves centered on 510 nm, and the organic chromophores are selected to absorb second light waves between 400 and 600 nm, with a peak at 510 nm, and emit the visible light in 500 to 800 nm range.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
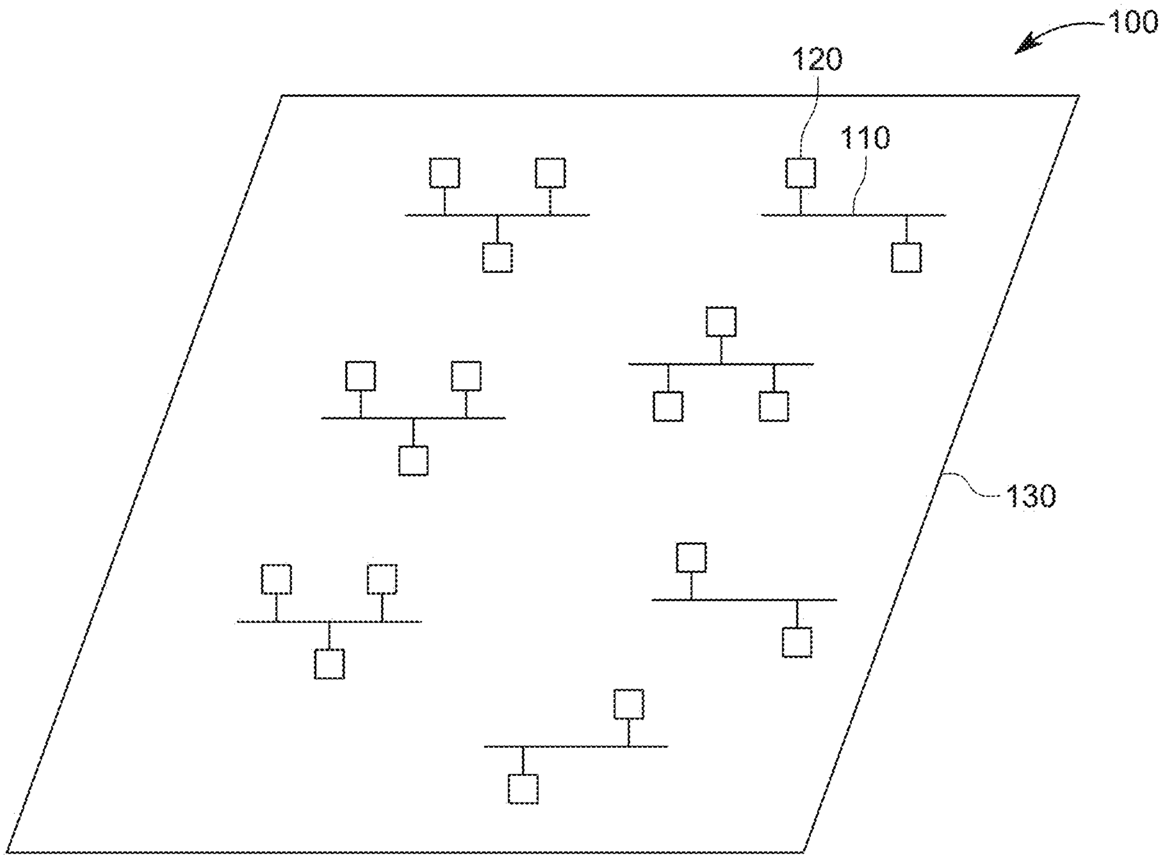
FIG. 1 is a schematic diagram of a nanocomposite that includes perovskite nanosheets and an organic chromophore.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a specific perovskite material ($CsPbBr_3$) and a specific organic chromophore (difluoroboron 1.3-diphenylamine β-diketonate). However, the embodiments to be discussed next are not limited only to these two specific materials, but may be applied to other similar materials, for example, other organic chromophores that exhibit the TADF character.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a highly efficient energy transfer at the interface of the perovskite nanosheet sensitizer is disclosed and this material is used to obtain an efficient and reabsorption-free organic X-ray imaging scintillator with excellent performance. The efficient and ultrafast interfacial energy transfer from the $CsPbBr_3$ nanosheet (antenna material) to the thermally activated delayed fluorescence (TADF) chromophore (luminescent center difluoroboron 1.3-diphenylamine β-diketonate) and the direct harnessing of both singlet and triplet excitons of the TADF chromophores are responsible for such outstanding X-ray imaging scintillators. The term "TADF" is understood in the following to be a process through which a molecular species in a non-emitting excited state can incorporate surrounding thermal energy to change states and only then undergo light emission. Thus, a molecule that has this feature, is called "TADF molecule" or a molecule that has a "TADF character." While the difluoroboron 1.3-diphenylamine β-diketonate used herein has the TADF character, note that many other TADF materials exist, but not all of them will be able to achieve the efficient energy transfer discussed herein.

The ultrafast time-resolved experiments and density functional theory (DFT) calculations performed by the inventors indicate that the efficient energy transfer results from the short interspecies distance and strong spectral overlapping between the $CsPbBr_3$ nanosheet and the TADF chromophore (difluoroboron 1.3-diphenylamine β-diketonate). Such a short distance not only guarantees the efficient energy transfer from the $CsPbBr_3$ nanosheet to the TADF chromophore but also facilitates the direct harnessing of both singlet and triplet excitons upon X-ray radiation of the TADF chromophore difluoroboron 1.3-diphenylamine β-diketonate. The fabricated nanocomposite scintillators that include the $CsPbBr_3$ and difluoroboron 1.3-diphenylamine β-diketonate exhibit a high X-ray imaging resolution of around 100 μm and a low detection limit of 38.7 nGy/s. The detection limit is about 21 times lower than the TADF chromophore counterpart and 142 times lower than a typical X-ray medical imaging, while the X-ray imaging resolution is even much better than the one reported previously for the same perovskite nanosheets counterpart, making this composite an excellent candidate for X-ray radiography.

Figure 2A:
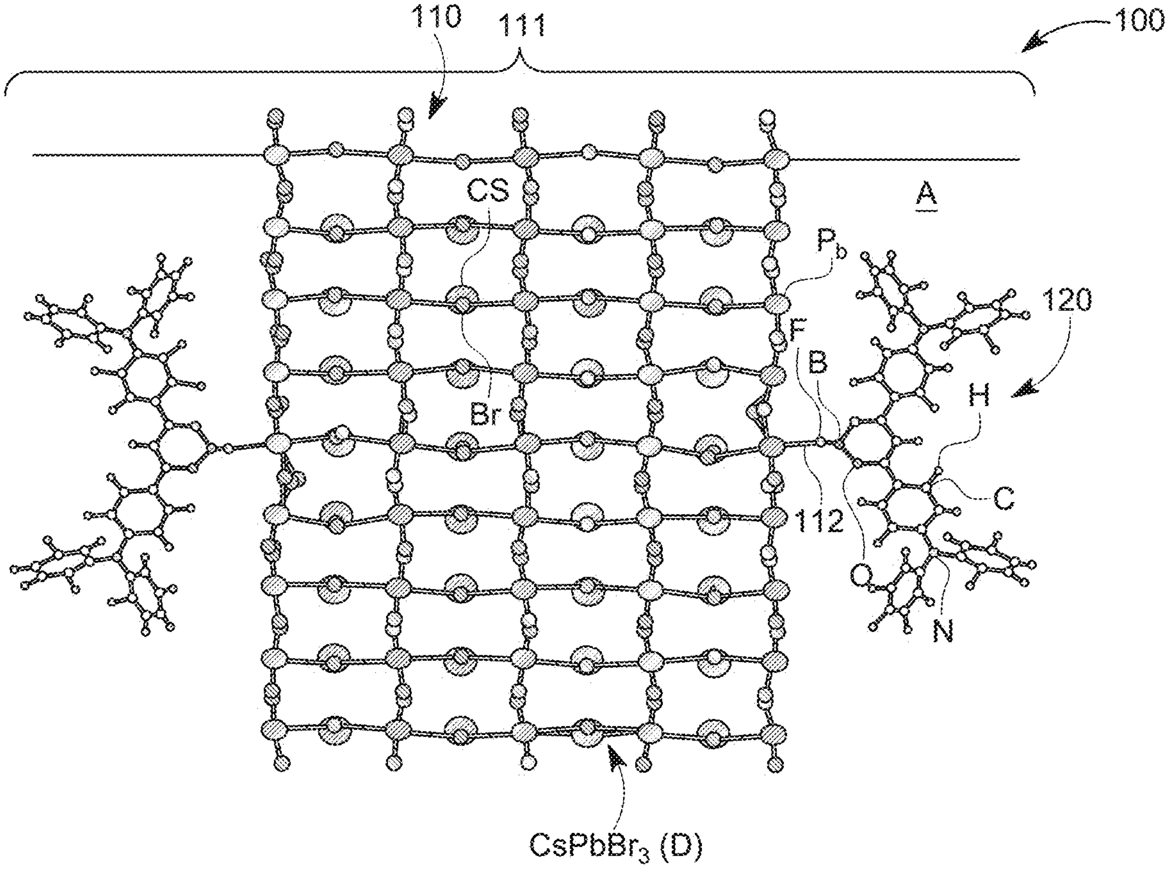
FIGS. 2A and 2B illustrate the atom distribution of a nanocomposite that includes perovskite nanosheets and the organic chromophore and the bonds formed between them.
Figure 2B:
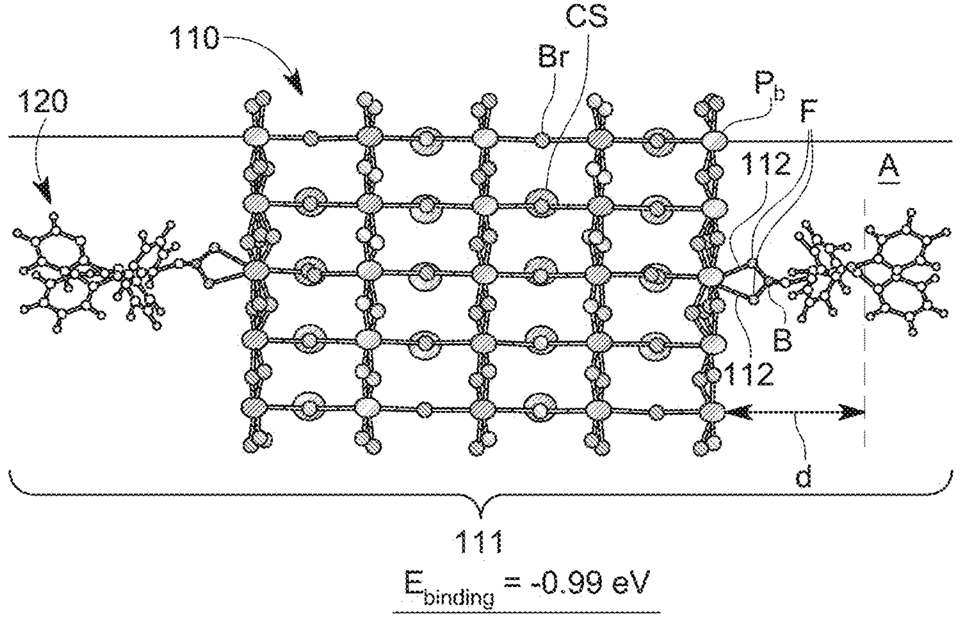
Figure 3A:
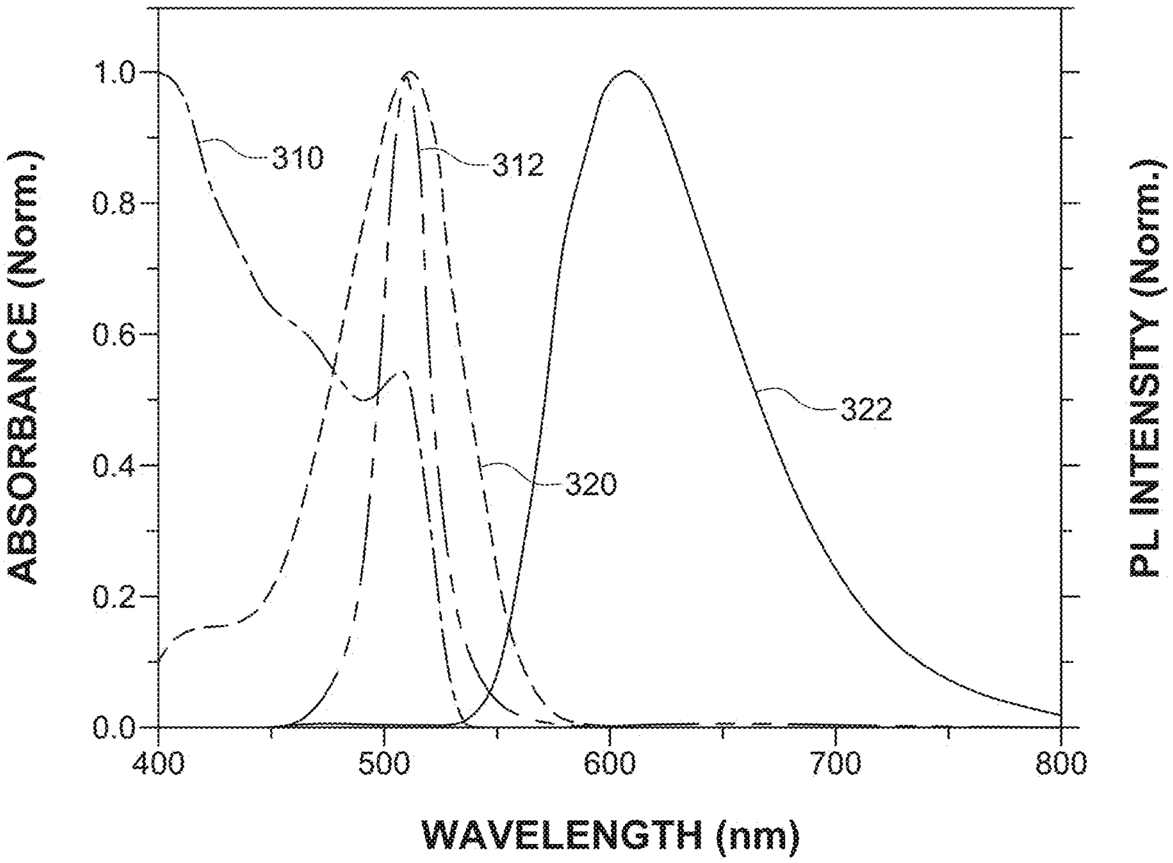
FIG. 3A illustrates the absorption and emission spectra of the perovskite nanosheets and the organic chromophore.

The nanocomposite 100 is schematically illustrated in FIG. 1 as having nanosheets 110 distributed over a substrate 130, and the organic TADF chromophore 120 attached to various locations along each nanosheet 120. A nanosheet is defined herein as a sheet of atoms that has a thickness in the nanorange, e.g., less than 100 nm. In one application, the nanosheets 110 are spatially arranged to be substantially parallel to each other. FIG. 2A shows a unit cell 111 whose multiplication in space forms the single nanosheet 110. Two TADF chromophore nanoparticles 120 are present for each unit cell 111, as shown in FIG. 2A. FIG. 2B shows the same unit cell 111 but at a different view angle so that the bonds formed between the two components of the composite 100 are better visible. Based on the four requirements discussed above, the inventors selected the $CsPbBr_3$ nanosheet (as a donor D) 110 to be the X-ray absorber material due to its high atomic number and photoluminescence quantum yield. The selected $CsPbBr_3$ nanosheet has a broad absorption band 310 in the green and blue spectral range and a strong emission band 312 centered at 510 nm, as shown in FIG. 3A. On the other hand, the selected TADF chromophore 120, which in this case was selected to be difluoroboron 1,3-diphenylamine β-diketonate (as the acceptor A), can harness both the singlet and triplet excitons. The TADF chromophore has a broad absorption band 320 from 400 to 600 nm spectral range with the main peak at 510 nm, which is strongly overlapped with the emission spectrum 312 of the donor D. Thus, the perovskite nanosheets are selected to absorb the X-ray radiation and emit light centered on 510 nm, and the organic chromophores are selected to absorb light between 400 and 600 nm, with a peak at 510 nm, and emit light in the 500 to 800 nm range. This perfect spectral overlap between the spectral emission of the donor D and spectral absorption of the acceptor A provides a solid foundation for efficient interspecies energy transfer. More importantly, the TADF molecules A contain two fluorine atoms F that could form strong bonds 112 with the lead atoms (F—Pb) within the $CsPbBr_3$ nanosheet (see FIGS. 2A and 2B), ensuring efficient interspecies energy transfer. Therefore, both the individual characteristics of the D and A components and their interspecies' interactions provide all the necessary conditions for engineering an efficient X-ray harvesting composite 100.

Figure 3B:
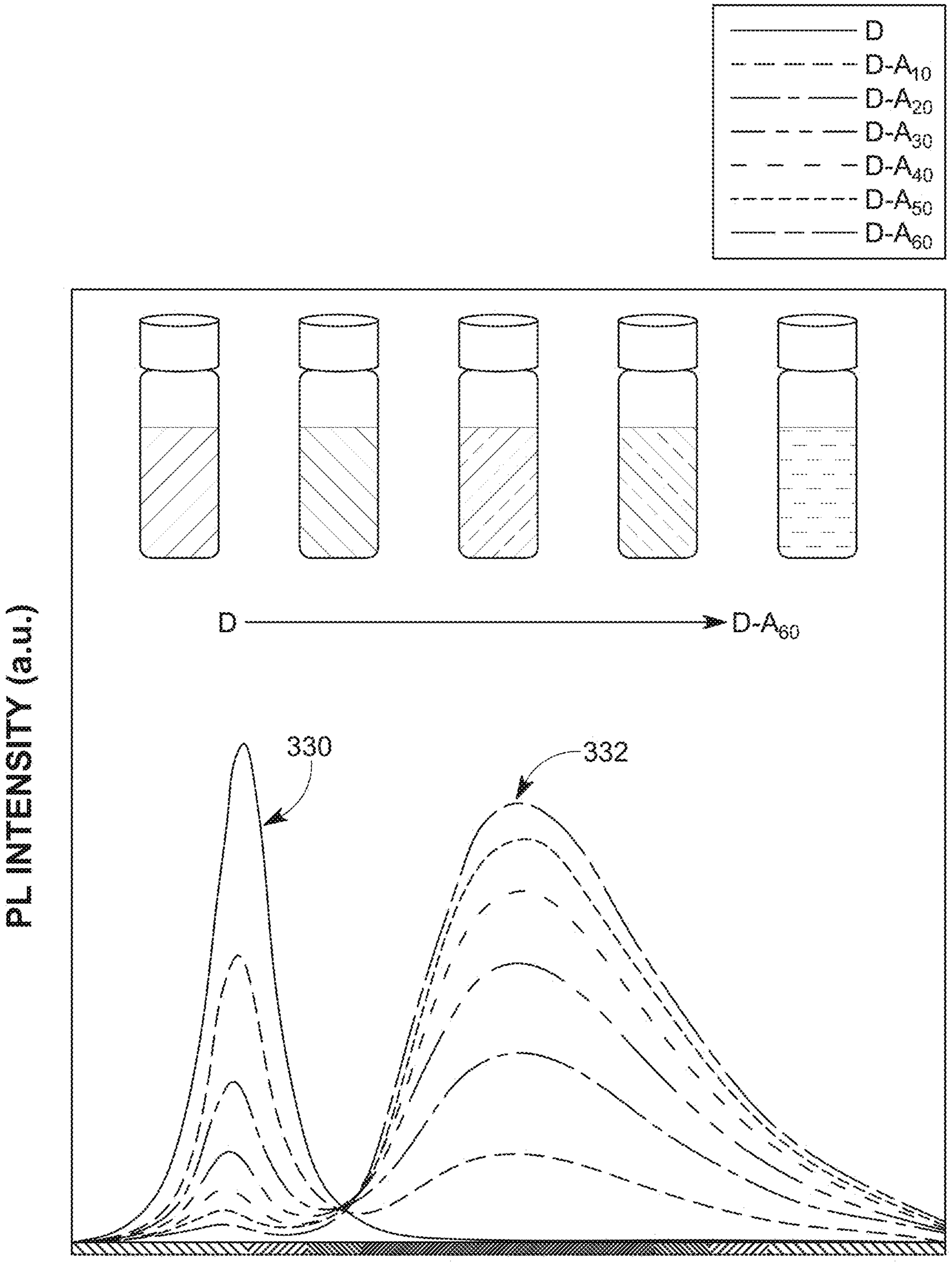
FIG. 3B shows the emission spectra of various concentrations of organic chromophores in the perovskite nanosheets.
Figure 3C:
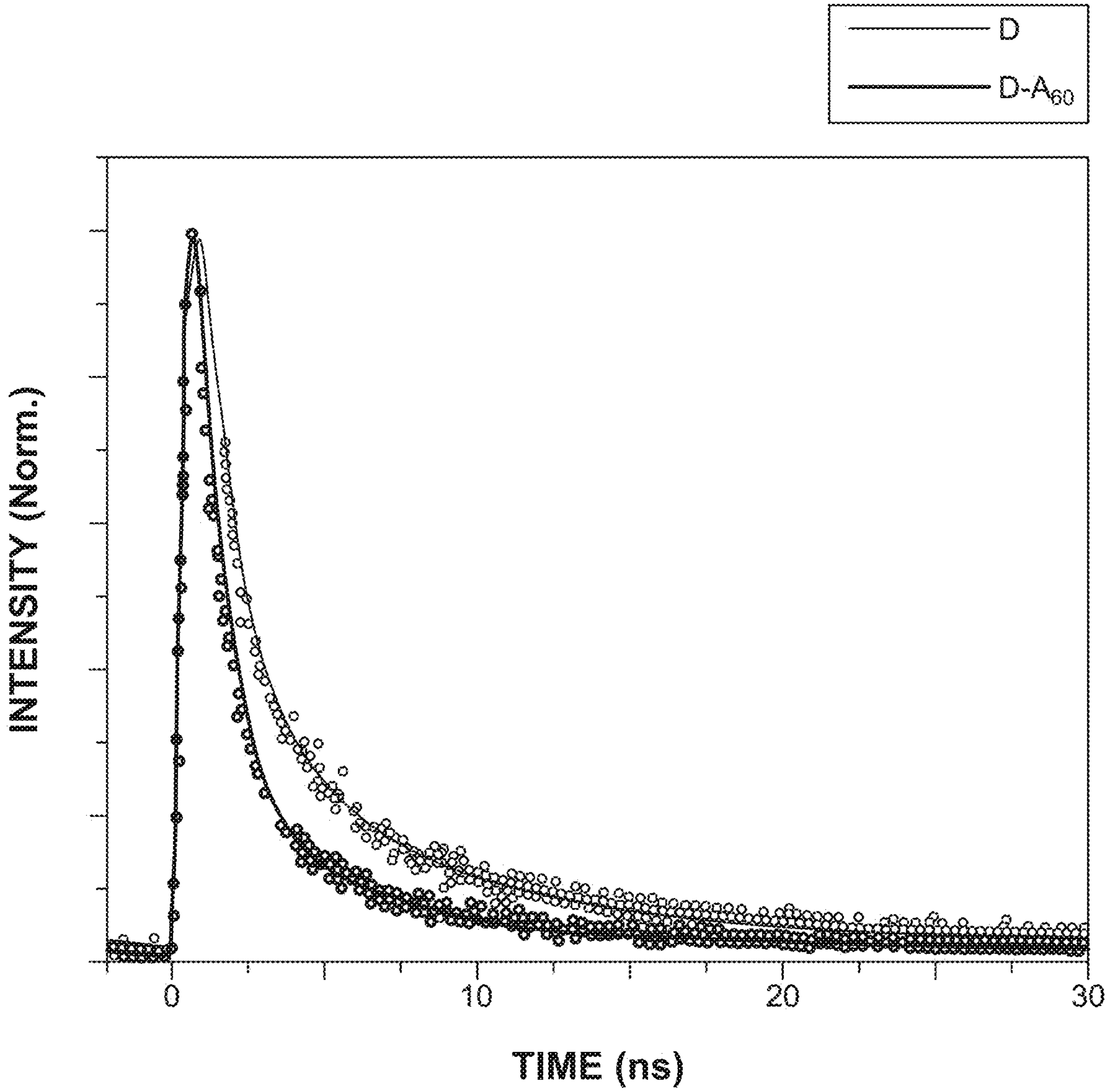
FIG. 3C illustrates the time-correlated single-photon counting measurement data for the pure perovskite nanosheets and for the composite.

The D-A nanocomposites 110 and 120 were engineered, according to an embodiment, by gradually adding A into the chloroform suspension of D, as schematically illustrated in FIG. 3B. The concentration of A in the solution varies from 0 to 60 μM, which is reflected by the label D-$A_n$ in the figure, where n indicates the amount of μM. At 400 nm irradiation (see FIG. 3B), increasing the fraction of A monotonically, shifted the emission maxima from that of pure D 330 to that of pure A 332 due to the energy transfer process. The efficient energy transfer from D to A was well confirmed by steady-state and time-resolved photoluminescence spectra. For instance, the luminescence intensity and lifetime of D were gradually quenched as the concentration of A increases, as illustrated in FIGS. 3B and 3C. As the concentration of A gradually increased, the luminescence color gradually changed from green to red (not shown), with good linearity of the CIE coordinates.

Figure 3D:
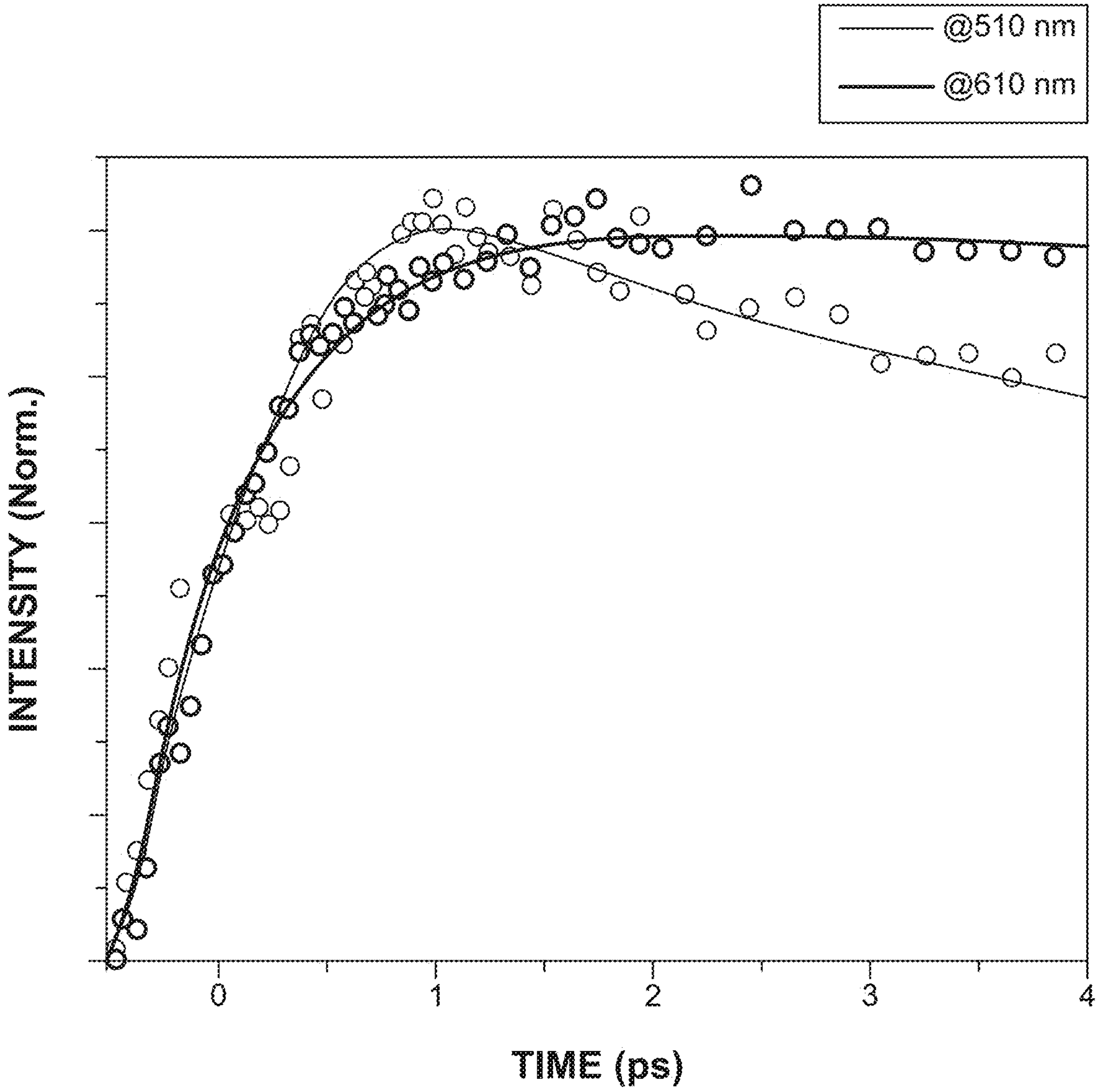
FIG. 3D illustrates the fluorescence up-conversion kinetic traces of the nanocomposite monitored at 510 and 610 nm at an early time scale.

The energy transfer efficiency between the donor D and the acceptor A was first calculated from the quenching of the luminescence intensity of D (based on FIG. 3B), which is more than 90%. In order to get a more accurate energy transfer efficiency, the fs-fluorescence up-conversion measurements of the D-A nanocomposites were recorded at 510 nm (donor moiety) and 610 nm (acceptor unit). The rise of the PL signal of the acceptor at 610 nm was determined to be around 1 ps, as shown in FIG. 3D. This time constant yielded an energy transfer rate of $10^{12}$ $s^{-1}$, resulting in a nearly 100% energy transfer efficiency through the Förster energy transfer described by equations (1) and (2):

$$k_{FRET} = \frac{1}{\tau_{ET}} \quad (1)$$

$$\varepsilon = \frac{1}{1 + \frac{1}{\tau_D k_{FRET}}} \quad (2)$$

$$k_{FRET} = \frac{1}{\tau_D}\left(\frac{R_0}{r}\right)^6, \quad (3)$$

where $\tau_{ET}$ is the energy transfer time constant obtained from the fs up-conversion experiments, $k_{FRET}$ is the energy transfer rate, and $\tau_D$ is the lifetime of D in the absence of A.

In addition, the interspecies distance between D and A can be estimated using equation (3), and the calculated distance was about 1.2 nm, where $R_0$ is the Forster distance and r is the distance between the centers of the D and A molecules. Such a short D-A distance not only guarantees the efficient interfacial energy transfer but also makes the direct harnessing of both singlet and triplet excitons upon X-ray radiation of the TADF chromophore possible (see later sections). Note that the interspecies distance between D and A may be about 1.2 nm, where the term “about” is used herein to indicate a +/−10% variation relative to the reference value characterized by this term.

Figure 4:
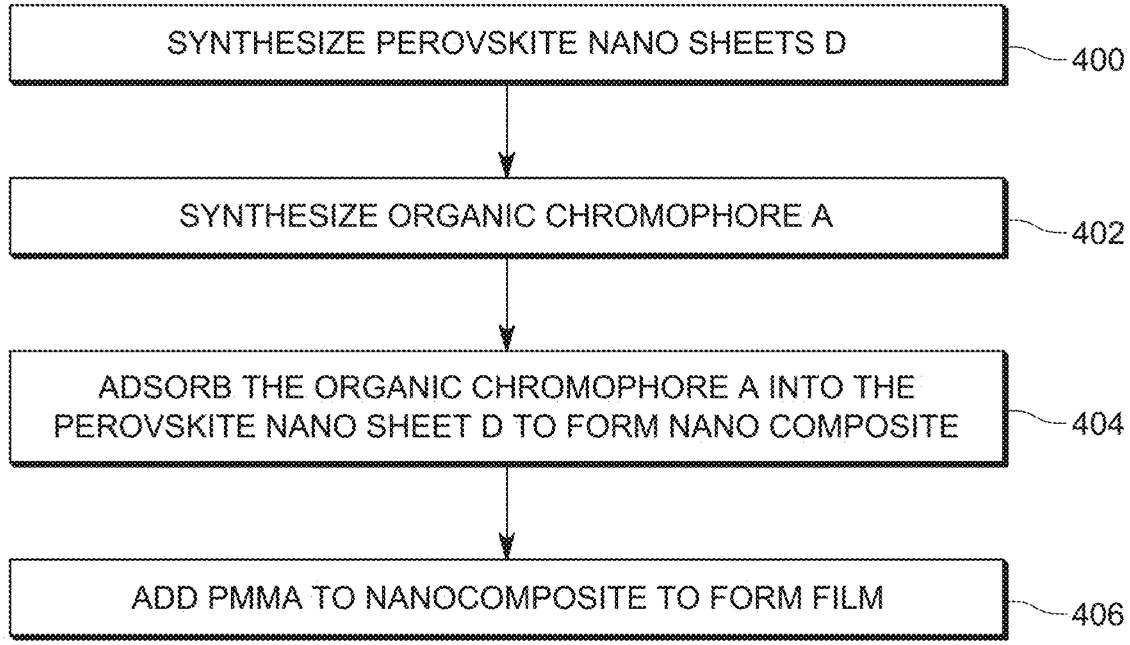
FIG. 4 is a flow chart of a method for making the composite of FIGS. 2A and 2B.
Figure 5:
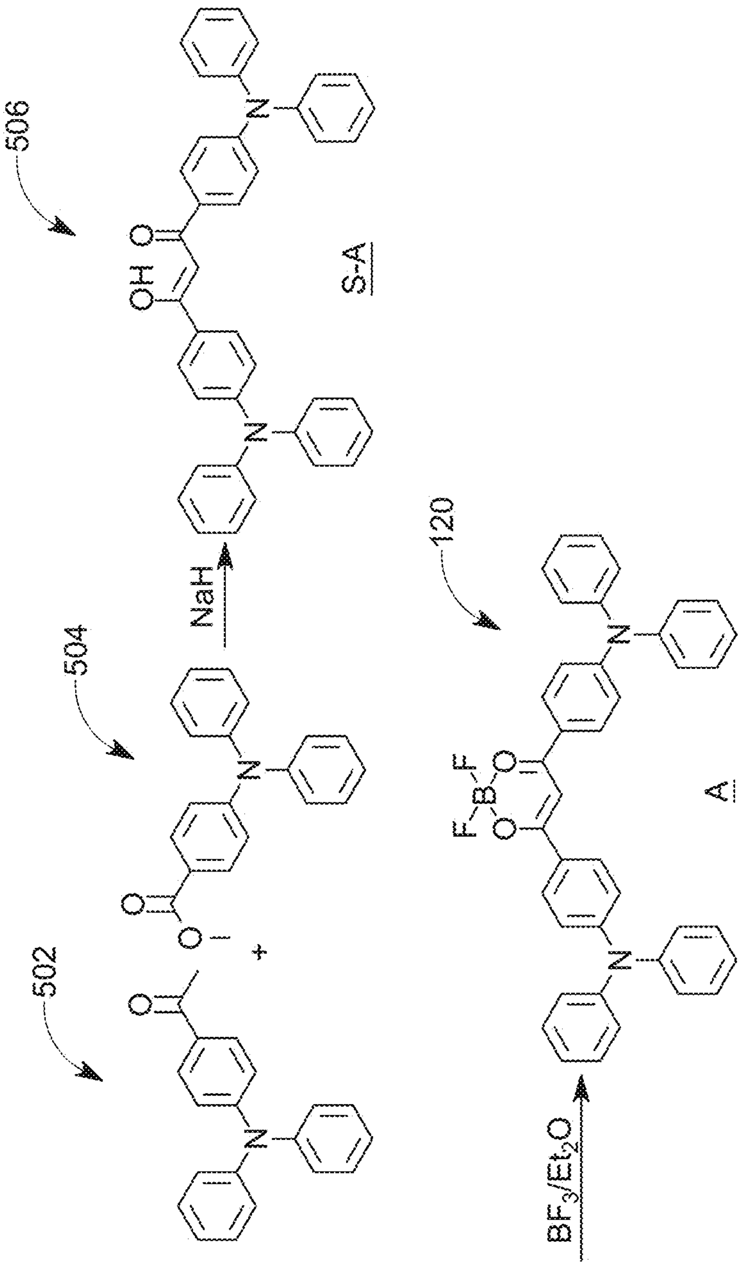
FIG. 5 illustrates the chemical structure of the organic chromophore.
Figure 6:
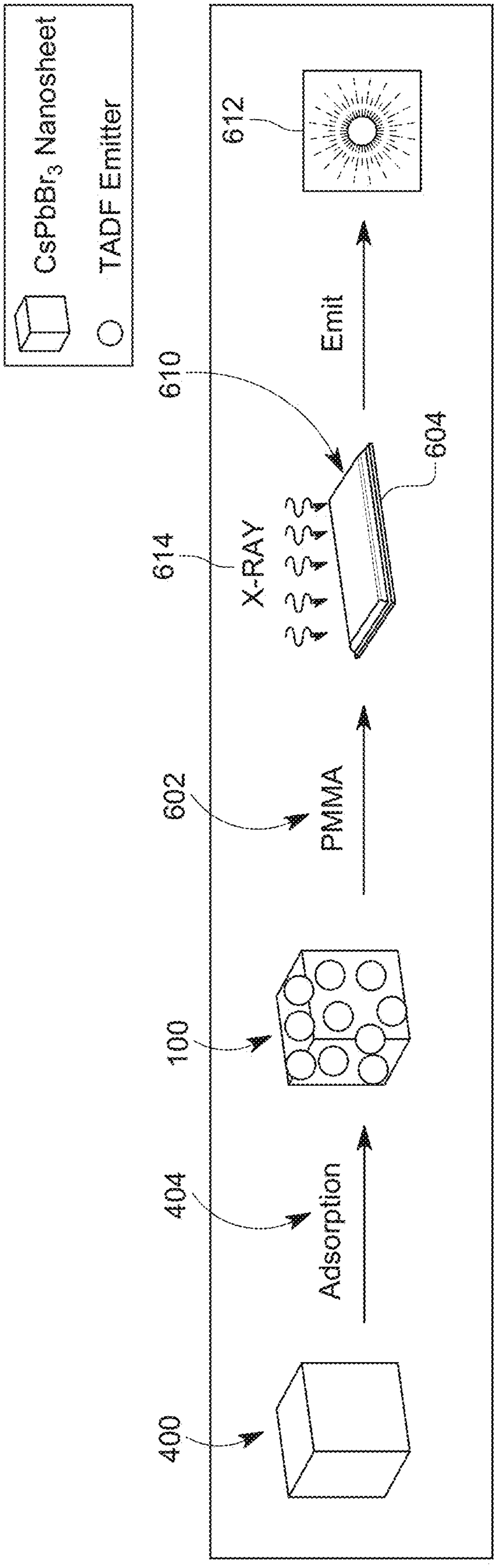
FIG. 6 schematically illustrates the manufacturing of an X-ray imagining film that includes the composite of FIGS. 2A and 2B.

The D-A nanocomposite 100 was further engineered into polymeric films 610 according to the method now discussed with regard to FIGS. 4 to 6. More specifically, the $CsPbBr_3$ nanosheets 110 were synthesized in step 400 by a sub-step (1) of preparing the Cs precursor solution. This sub-step involves dissolving 32 mg of CsAc in 1 mL of 1-PrOH in a 20 mL vial under stirring in air at room temperature, followed by addition of 6 mL of hexane and 2 mL of 1-PrOH, and keep stirring until all ingredients are dissolved. In sub-step (2), the preparation of the $PbBr_2$ precursor is performed, which involves dissolving 245 mg of $PbBr_2$ in a mixture solution of 0.45 mL of 1-PrOH, 0.45 mL of oleic acid (OcAc), and 0.45 mL of Oleylamine (OcAm) at 90° C. in air under vigorous stirring. In sub-step (3), the preparation of the $CsPbBr_3$ nanosheets is performed, which involves injecting the hot $PbBr_2$ precursor into the Cs precursor swiftly under vigorous stirring at room temperature. The system turned green immediately, and the reaction was completed in 2 min. The $CsPbBr_3$ NCs 110 were isolated by centrifugation at 4000 rpm, and the pellet was dispersed into 5 mL of toluene.

In step 402, the synthesis of the organic chromophore A 120 was performed. This step includes a sub-step (1) of dissolving 1-(4-(diphenylamino)phenyl) ethanone (1.0 g, 3.5 mmol) 502 in 10 mL anhydrous THF 504 in a high-pressure tube, as schematically illustrated in FIG. 5. After bubbling with $N_2$ for 5 min in sub-step (2), NaH (57-63% oil dispersion, 800 mg, 20.0 mmol) and methyl 4-(diphenylamino)benzoate (1.1 g, 3.5 mmol) were added in sub-step (3). The resulting mixture was stirred at 60° C. for 24 h under $N_2$ atmosphere. The reaction mixture was then cooled to room temperature and quenched with 100 ml of ionized water in sub-step (4). The pH was adjusted in sub-step (5) to 3 with diluted HCl (aq) and the product was extracted with $CH_2Cl_2$. The combined organic phase was dried in sub-step (6) over anhydrous $Na_2SO_4$, followed by filtration and evaporation of the solvent. The residue S-A 506 was used directly for the next step without further purification. To a solution of S-A in 30 mL $CH_2Cl_2$ was added in sub-step (7) triethylamine, $Et_3N$, (2.0 mL) and boron trifluoride/diethylether, $BF_3/Et_2O$, (2.0 mL). The resulting reaction mixture was stirred for 2 h at room temperature in the dark, followed by addition of 100 ml of water in sub-step (7). The organic layers were collected, washed with saturated aqueous $NH_4Cl$ and dried over anhydrous $Na_2SO_4$, followed by filtration and evaporation of the solvent in sub-step (8), to obtain the organic chromophore A 120.

In step 404, the perovskite nanosheets D and the organic chromophore A were mixed together so that the organic chromophore A could interact with the perovskite nanosheets D to form a mixture of nanocomposites 100. In step 406, the nanocomposites 100 with different D-$A_n$ ratios dispersed in the chloroform solution were mixed with a polymer matrix 602, for example, poly(methyl methacrylate) (PMMA), as shown in FIG. 6. Index “n” stands for the mass amount of A in the formed film 610, in percentage, relative to the total mass of the film 610. For example, D-$A_{2.0}$ means 2% by mass is A, 2% is D, and the rest of 96% is the polymer matrix 602. Other polymers than PMMA may be used to encapsulate the D and A nanomaterials. In one application, the D and A are homogenously distributed within the polymer matrix 602. The mixture was sonicated for 2 min and then shaken on a shaker for 3 h to ensure that the D-A nanocomposites 100 and the polymer 602 were well mixed. The viscous solution was carefully coated on a transparent substrate 604, for example, quartz plates, and then covered with a beaker to allow the solvent to evaporate slowly in order to obtain the X-ray imagining film 610 with a uniform surface and good morphology. This X-ray imagining film 610 would emit visible light 612 when irradiated with X-ray 614, also schematically illustrated in FIG. 6.

Figure 7:
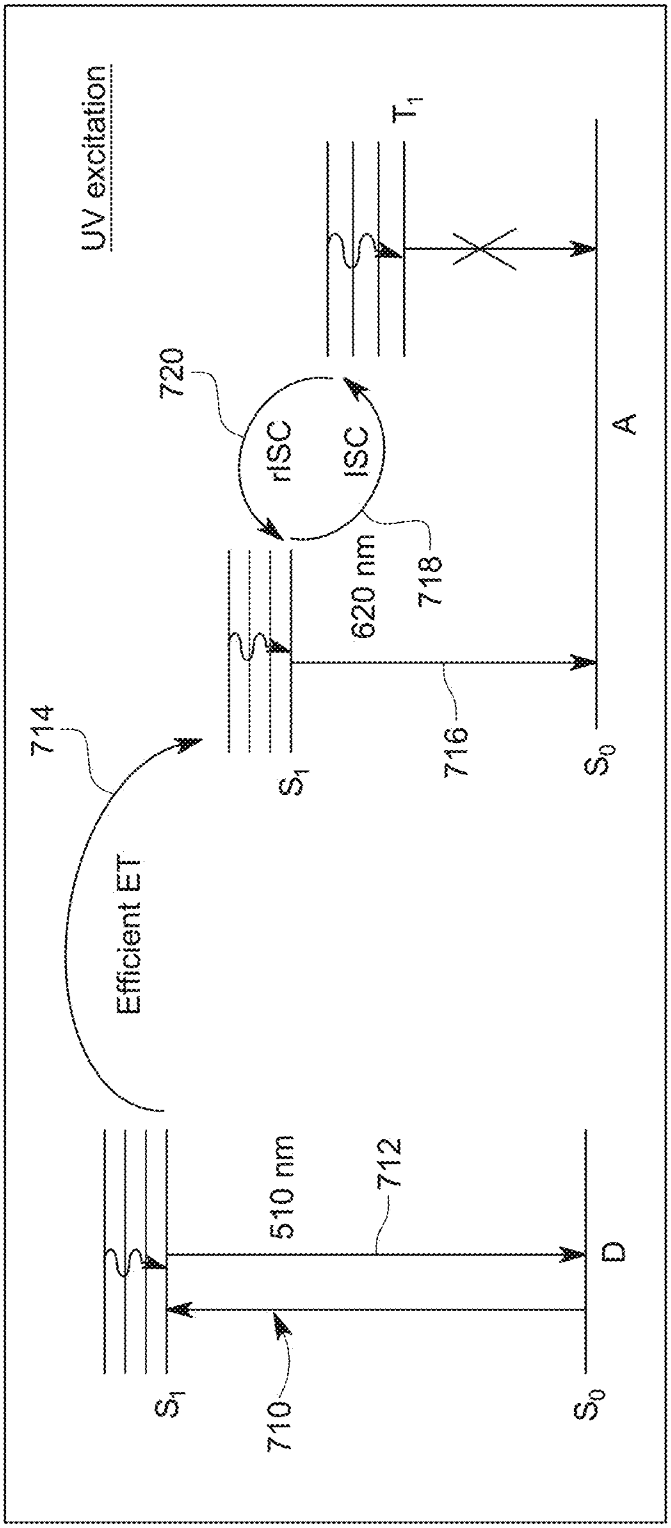
FIG. 7 illustrates the efficient energy transfer from the nanosheets to the organic chromophores under UV-light excitation.

FIGS. 3B and 3C show the quenching of the luminescence intensity and lifetime of D and the increasing of the luminescence of A. In addition, the near unit energy transfer efficiency was also obtained from the fs-fluorescence upconversion experiment. This behavior of the X-ray imagining film 610 demonstrates that the energy transfer is still highly efficient after encapsulating the nanocomposites inside a polymer matrix, as schematically illustrated in FIG. 7. FIG. 7 further shows the singlet states S0 and S1 for the donor D, and acceptor A, and the triplet state T1 for the acceptor A. In this embodiment, for simplicity, the donor D was excited 710 with UV radiation instead of X-ray radiation. However, the processes shown in this figure are the same for both radiations. The energy absorbed by the donor D is transferred 714 to a singlet state S1 of the acceptor A. This energy transfer 714 is near unity because of the almost perfect alignment of the emission spectrum of D and the absorption spectrum of A, as discussed with regard to FIG. 3A. The transferred energy is used by the acceptor A to emit light 716 with a wavelength of 620 nm through scintillation. Note that the emission 716 by the acceptor A results from the triplet excited state T1 undergoing thermally activated reverse intersystem crossing (RISC) 720 to the emissive S1 state, as schematically shown in FIG. 7. The figure also shows the intersystem crossing (ISC) and thermally activated reverse intersystem crossing (rISC) 718. Thus, the combination of the donor D and the acceptor A results in the harnessing of both single S1 and triple T1 states in the acceptor A, which makes this process and film very efficient.

Figure 8A:
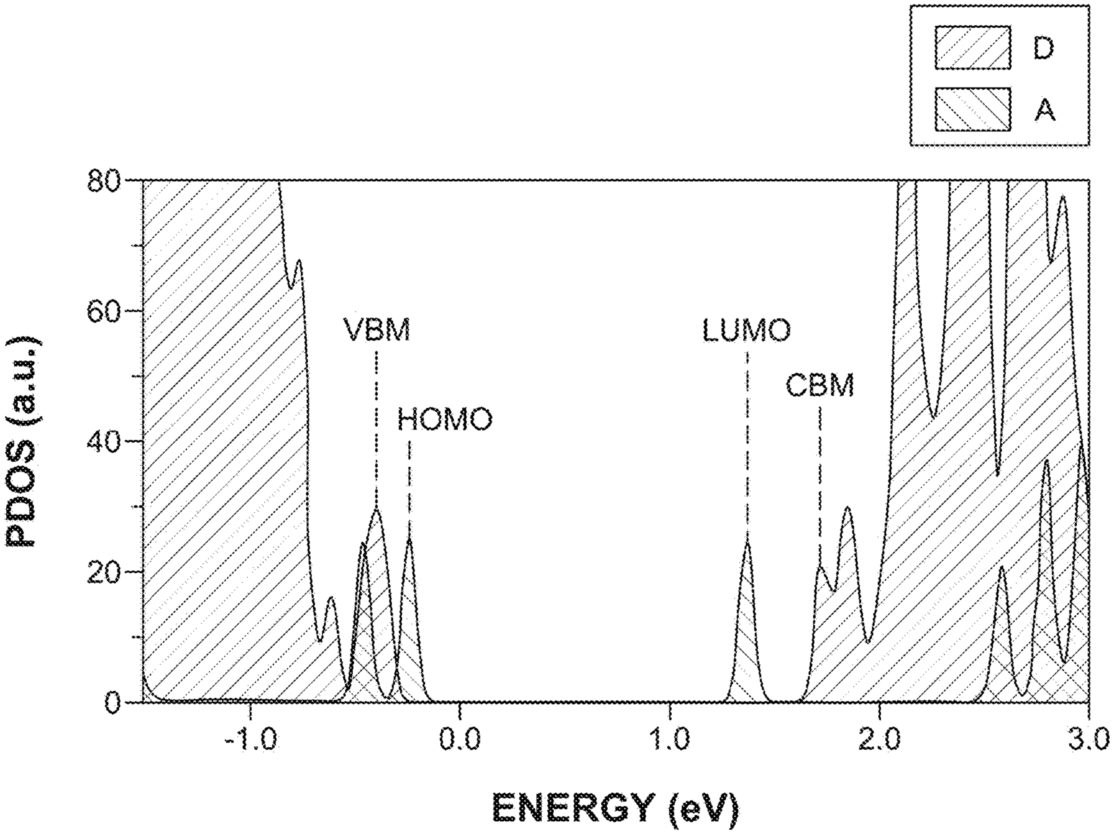
FIGS. 8A and 8B illustrate the projected density of states for the composite and energy transfer diagram within the composite, respectively.
Figure 8B:
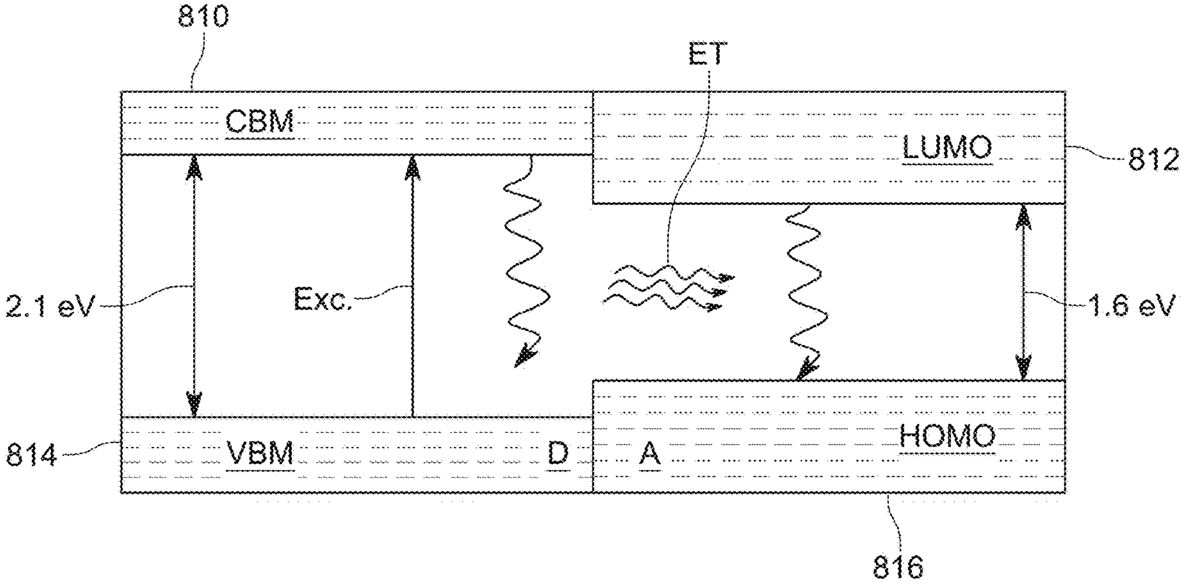

To characterize and confirm the highly efficient energy transfer 714 from D to A for the X-ray imagining film 610, density functional theory (DFT) calculations were performed. By analyzing the projected density of states (PDOS) of the interspecies' interactions between the A molecules and the $CsPbBr_3$ nanosheet, the inventors found that the A molecules 120 were strongly adsorbed on the surface of the $CsPbBr_3$ nanosheet 110 with a large binding energy of −0.99 eV, as illustrated in FIGS. 2A and 2B. The F—Pb bond formed between the F atoms of the A molecules 120 and the Pb atoms in the $CsPbBr_3$ nanosheet 110 significantly contributed to the strong interspecies' interactions, which provide the basic prerequisite for the efficient energy transfer from D to A. The optimized D-A distance is estimated to be about 1.0 nm, consistent with the experimental value. The distance (shown in FIG. 2B as distance "d") is measured between the lead atom of the perovskite 110 and the center of the organic material. The energy transfer efficiency calculated from equations (2) and (3) using the D-A distance r from the DFT calculation is also around 100% and agrees well with the experimental data. In addition, the conduction band minimum (CBM) 810 of D, which is shown in FIGS. 8A and 8B, is much higher than the lowest unoccupied molecular orbital (LUMO) 812 of A, while the valence band maxima (VBM) 814 of D is much lower than the highest occupied molecular orbital (HOMO) 816 of A, as shown in FIGS. 8A and 8B. Such type-I alignments of the D-A heterojunctions indicate that the efficient energy transfer from D to A is achievable.

Figure 9:
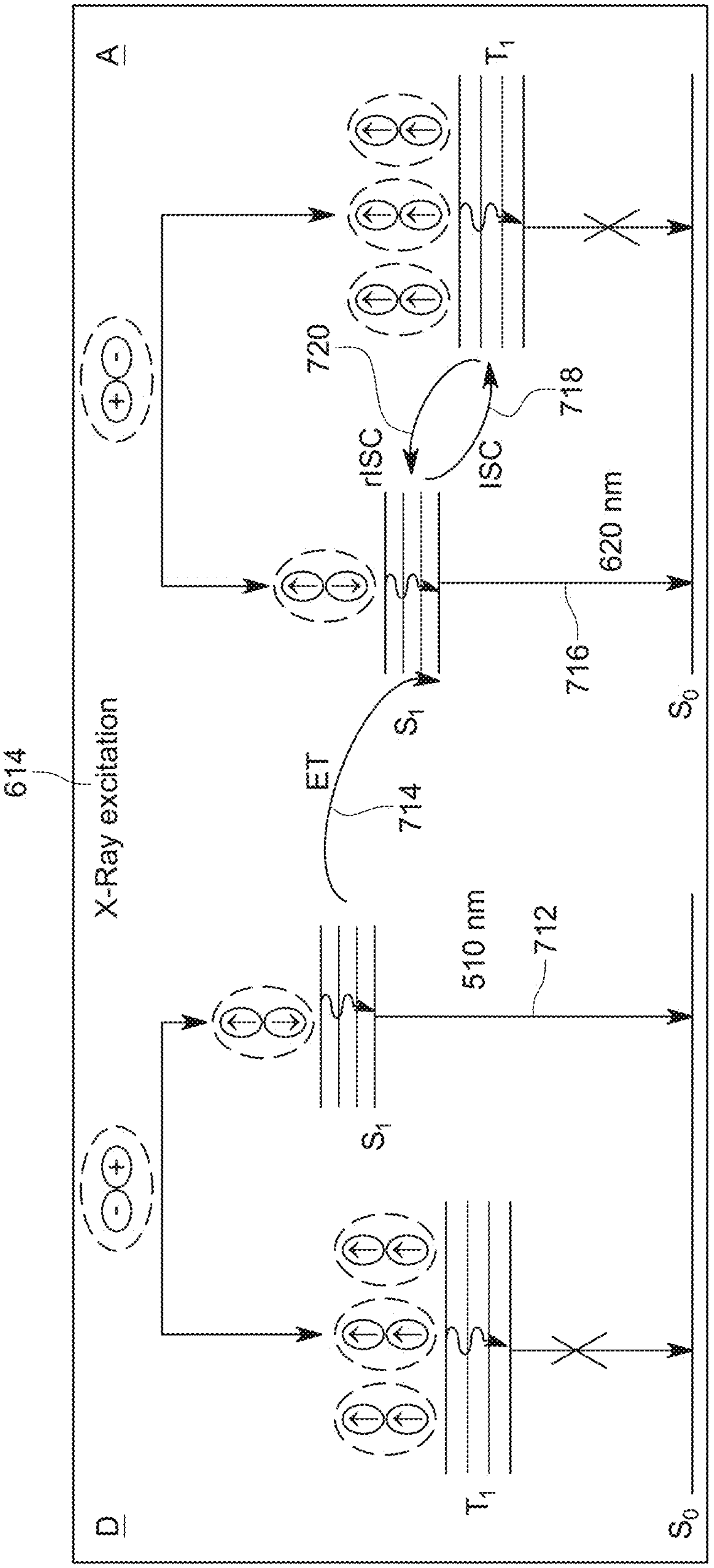
FIG. 9 illustrates a mechanism in the composite that enhances the RL of the organic chromophores under X-ray excitation.

The radioluminescence (RL) spectra of the D-$A_n$ nanocomposite films 610 show a nearly identical trend with the corresponding photoluminescence (PL) spectra under UV excitation (not shown), but the RL from A was highly enhanced by the efficient energy transfer 714 from the $CsPbBr_3$ nanosheets. The ratios of the luminescence intensity between the emission maxima of A and D derived from RL are 2-10 times larger than those of the ultraviolet-excited counterparts. Therefore, besides the energy transfer from D to A, there should be other processes that can further enhance the RL intensity of A. Because of the recombination of the electron and hole pairs after X-ray excitation 614, the singlet and triplet excitons with a 1:3 ratio were generated, according to spin statistics. Therefore, the direct harnessing of both singlet and triplet excitons of the TADF chromophores (A) for light emission through fluorescence delay channels 720 greatly contributed to its RL enhancements, which is schematically illustrated in FIG. 9. It is worth mentioning that the X-ray light can also interact with small atoms (like O and C atoms) in the acceptor molecules to generate excitons and emit photons. However, their low X-ray absorption cross-section always leads to a very weak radio-luminescence signal.

Figure 10A:
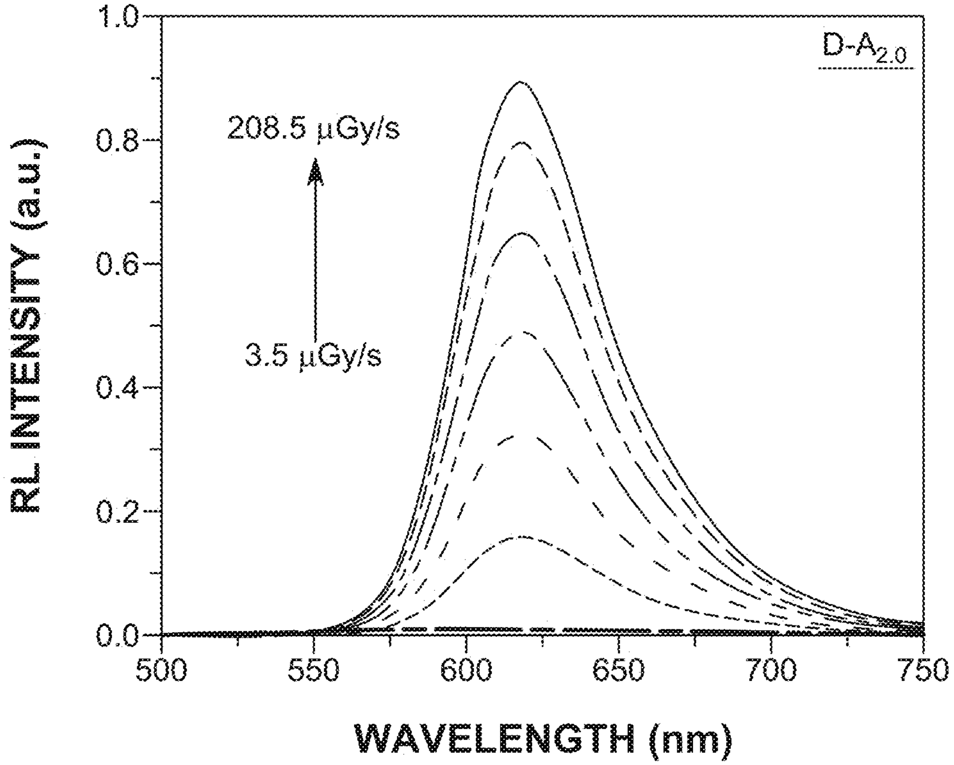
FIG. 10A illustrates dose rate-dependent RL spectra for the nanocomposite film.
Figure 10B:
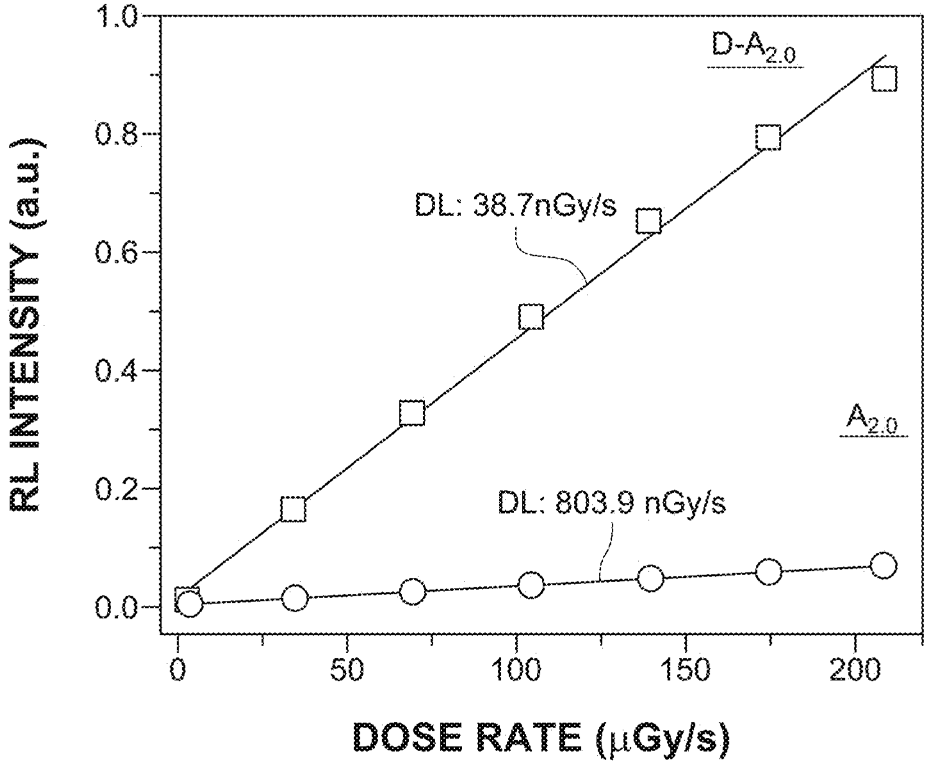
FIG. 10B illustrates the detection limit of the composite film.

The RL intensity of the $A_{2.0}$ film and the D-$A_{2.0}$ nanocomposite film 610 were linearly correlated with the dose rate of X-rays, respectively. The detection limits were highly improved from the $A_{2.0}$'s 803.9 nGy/s to the 38.7 nGy/s of the D-$A_{2.0}$ nanocomposite film 610, as shown in FIGS. 10A and 10B, which is approximately 142 times lower than a standard dosage for an X-ray diagnostic (5.5 μGy/s). In addition, the D-A nanocomposites film 610 has good photostability and the RL intensity remained at around 90% of the initial value under continuous ionizing radiation at the dose rate of 173.75 μGy/s for 3000 s.

Figure 11:
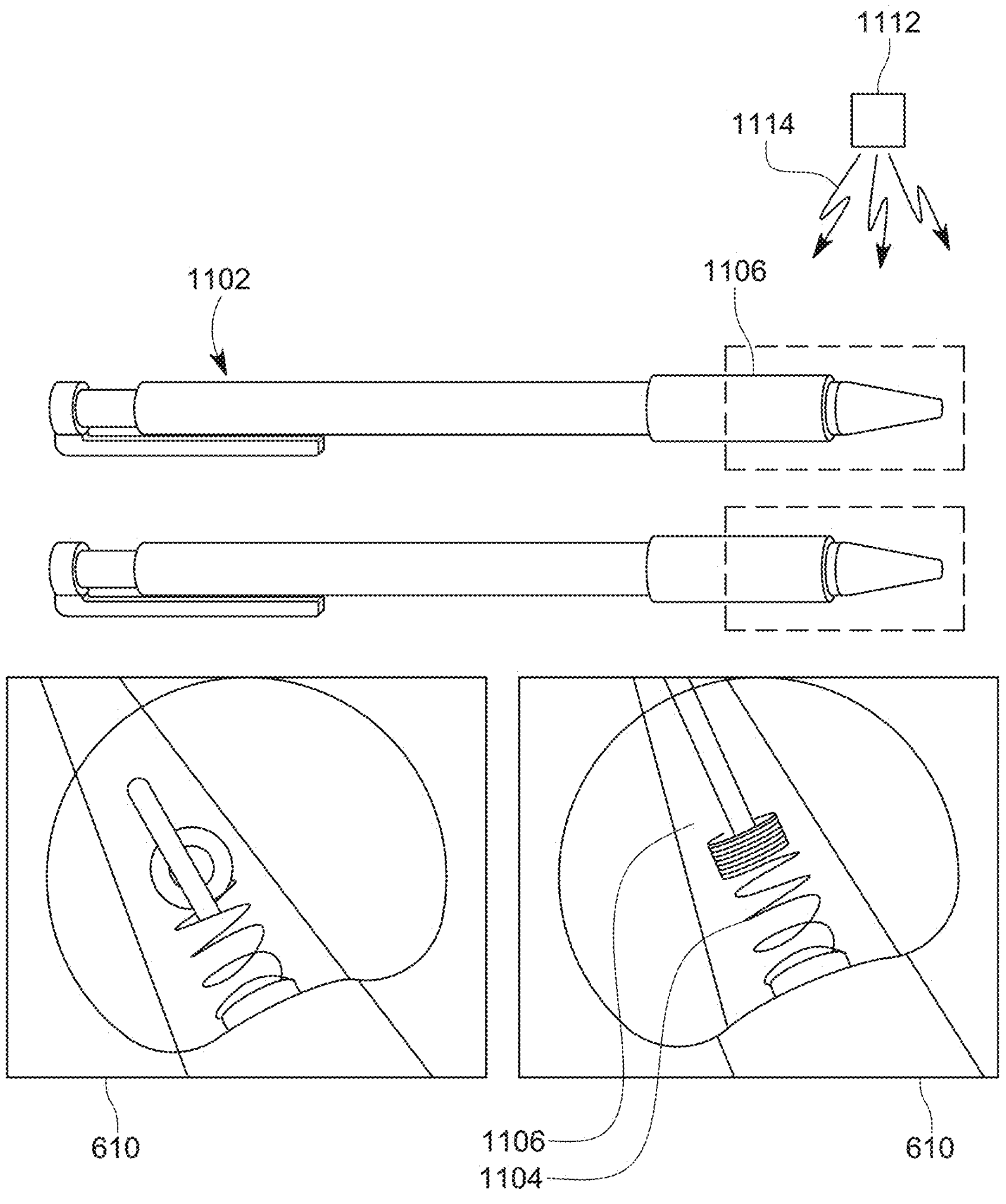
FIG. 11 illustrates the image of a pen before and after X-ray exposure using the composite.
Figure 12:
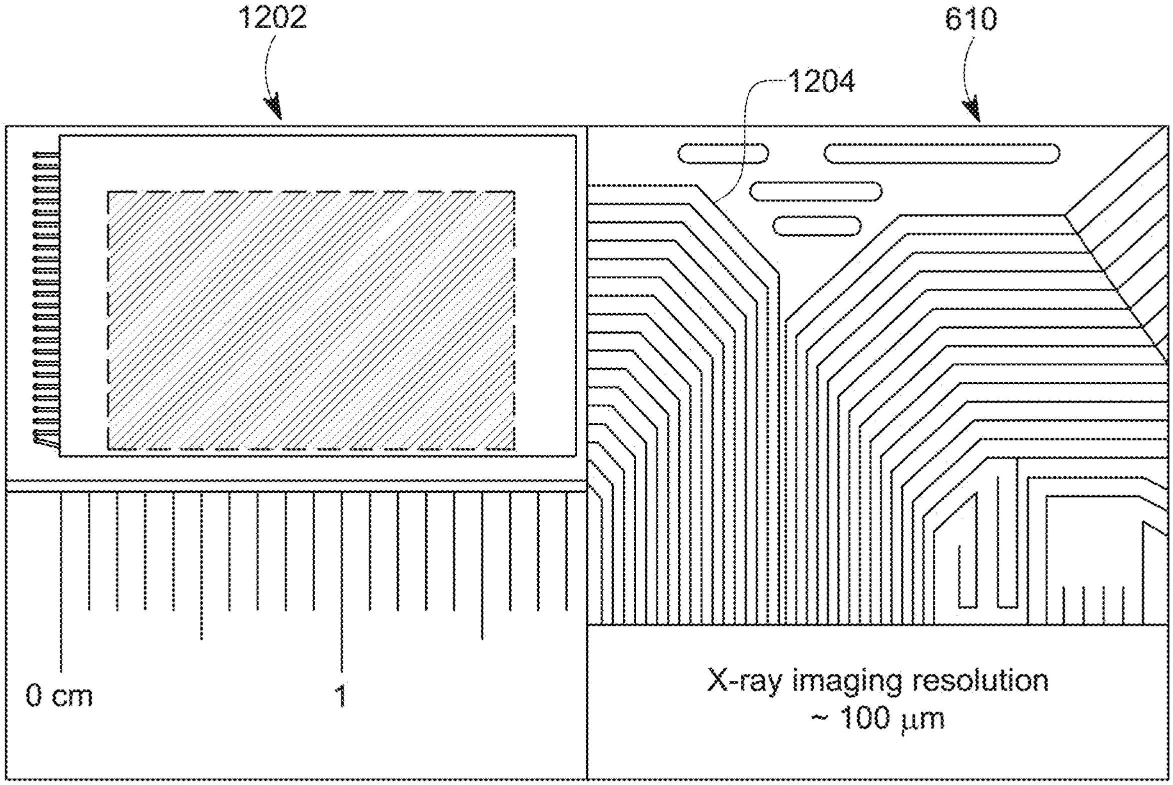
FIG. 12 illustrates the image of a chip before and after X-ray exposure using the composite.

To further evaluate the X-ray imaging applications of the D-A nanocomposite film 610, the inventors characterized the imaging capability of the D-$A_{2.0}$ film by imaging different devices with distinct compositions and structures. First, as shown in FIG. 11, a pen 1102 with a metal spring 1104 (which is not visible with the bare eye) inside a plastic casing 1106 (which is visible in the figure and not transparent) was placed between an X-ray source 1112 and the D-$A_{2.0}$ nanocomposite film 610. The outline of the inside metal spring 1104 can be clearly seen on the film 610 when irradiated with X-rays 1114, while the plastic case 1106 of the pen is close to transparent. The distinct color contrast between the metal 1104 and plastic 1106 components of the pen 1102 displayed on the D-$A_{2.0}$ scintillator screen 610 shows that it can distinguish object structures. In addition, the application of this principle of X-ray contrast imaging also enabled inspection of the complicated inner structures of an electronic chip 1202 that are otherwise opaque to visible light. The configuration inside electronic chips cannot be observed directly with the naked eye; however, the various components 1204 of the chip 1202 are revealed using X-ray imaging with the D-$A_{2.0}$ scintillator screen 610 as shown in FIG. 12. The clear spatial intensity contrast displayed on the D-$A_{2.0}$ scintillator screen allowed the inventors to calculate the X-ray imaging spatial resolution by fitting the point spread function of the intensity profile (not shown), which is 135 μm. This high imaging resolution not only exceeds its perovskite nanosheet (D) counterpart but is also higher than many of reported inorganic scintillation materials [5]. This further proves the high practical application values of the strategy proposed in the above embodiments.

Figure 13:
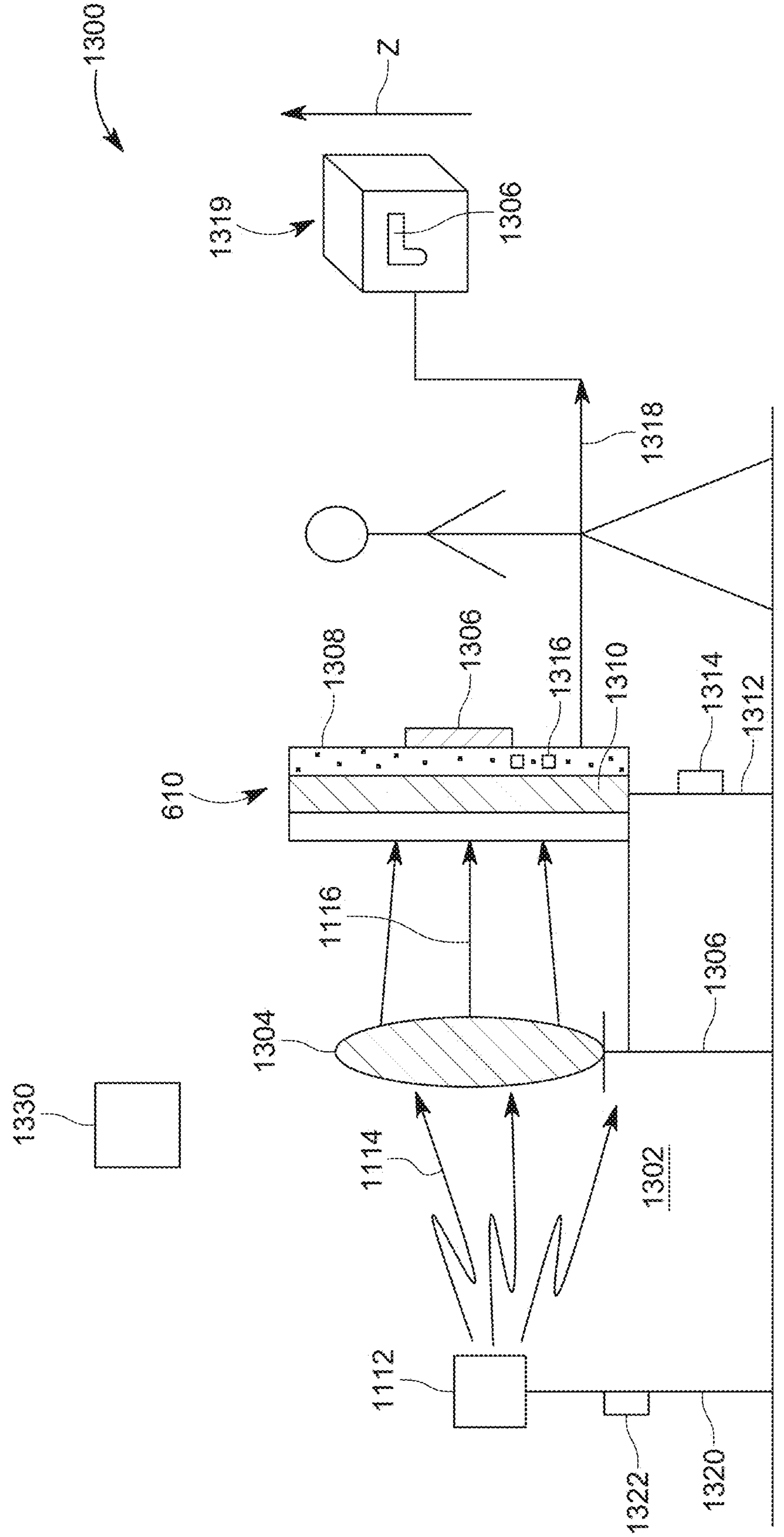
FIG. 13 is a schematic diagram of an X-ray imagining system that uses the composite of FIG. 6.

Thus, an imaging system 1300 that uses the D-A nanocomposites film 610 discussed above is presented in FIG. 13. The imaging system 1300 includes the film 610, which is placed at a location so that a human may observe it. The film 610 may be attached to a frame 1310 for support. The frame 1310 may be connected to a support 1312 and actuation mechanism 1314 for supporting the film and also for moving the film along a vertical axis Z as desired by the user. $A_n$ X-ray source 1112 is placed at a certain distance away from the film 610, so that a target space 1302 is generated. A target 1304 is placed on a target support 1306, between the X-ray source 1112 and the film 610. The X-ray source 1112 may be placed on a corresponding support 1320, which may have an actuation system 1322, for positioning the source vertically and horizontally, at a desired distance from the film 610. All the actuation systems may be coordinated by a controller 1330, in a wired or wireless manner. The controller may have an input/output interface so that can receive commands from the user. In one application, the user may control the intensity of the X-ray 1114 emitted by the source 1112. A thickness of the film 610 may be between 50-500 μm and a size of the film may be about 2×2 cm. Note that in this embodiment, the X-ray radiation 1116 that has passed through the target 1304 directly impinges on one surface of the film 610, and the image 1306 of the target is visible to the user on the opposite surface of the film 610. In one application, if the film 610 is formed on transparent substrate 1308, for example, quartz, the image 1306 of the target is visible through the substrate 1308. In one application, the substrate 1308 may be provided with plural photodetectors 1316 so that the visible or near-visible light generated by the composite film 610 is transformed into an electrical signal 1118, and the electrical signal is transmitted to a monitor 1319, which displays the image 1306.

Thus, a highly efficient energy transfer strategy is presented here to realize efficient and reabsorption-free organic-based X-ray imaging scintillators 1300. The efficient interfacial energy transfer from the $CsPbBr_3$ nanosheet (X-ray absorber) to the TADF chromophore (the luminescent center) and the direct harnessing of both singlet and triplet excitons of the TADF chromophore led to a remarkable enhanced organic chromophore-centered radioluminescence. The ultrafast time-resolved experiments supported by density functional theory (DFT) calculations demonstrate that the efficient energy transfer results from the short interspecies distance (about 1 nm) and complete spectral overlapping between the $CsPbBr_3$ nanosheet 110 and the TADF chromophore 120. Such a short distance with strong electronic coupling not only guarantees the efficient energy transfer from the $CsPbBr_3$ nanosheets to the TADF chromophores, but also makes the direct harnessing of both singlet and triplet excitons upon X-ray radiation of the TADF chromophore possible, as evident from the X-ray spectroscopy experiments. The fabricated organic-based scintillators 1300 exhibit a 135 μm imaging resolution and a low detection limit of 38.7 nGy/s, which is 142 times lower than a typical standard dose for X-ray medical imaging. This high X-ray imaging resolution not only exceeds its perovskite nanosheet counterparts but is also higher than many reported inorganic scintillators, demonstrating its high potentials in X-ray imaging applications. The new strategy presented here provides a useful design approach for creating organic scintillation materials with high imaging resolution and ultralow X-ray detection limits for medical radiography and security screening applications.

The disclosed embodiments provide a nanocomposite film that absorbs X-ray radiation and transforms it into a visible image with high resolution and ultralow X-ray detection limit. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] Zeng, Y.; Chen, J.; Yu, T.; Yang, G.; Li, Y. Molecular-Supramolecular Light Harvesting for Photochemical Energy Conversion: Making Every Photon Count. ACS Energy Lett. 2017, 2, 357-363.

[2] Yang, J.; Wu, X.; Shi, J.; Tong, B.; Lei, Y.; Cai, Z.; Dong, Y. Achieving Efficient Phosphorescence and Mechanoluminescence in Organic Host-Guest System by Energy Transfer. Adv. Funct. Mater. 2021, 31, 2108072.

[3] Zheng, B.; Zhong, D.; Xie, T.; Zhou, J.; Li, W.; Ilyas, A.; Lu, Y.; Zhou, M.; Deng, R. Near-Infrared Photosensitization via Direct Triplet Energy Transfer from Lanthanide Nanoparticles. Chem. 2021, 7, 1615-1625.

[4] Patalag, L. J.; Hoche, J.; Holzapfel, M.; Schmiedel, A.; Mitric, R.; Lambert, C.; Werz, D. B. Ultrafast Resonance Energy Transfer in Ethylene-Bridged BODIPY Heterooligomers: From Frenkel to Forster Coupling Limit. J. Am. Chem. Soc. 2021, 143, 7414-7425.

[5] Xu, L. J.; Lin, X.; He, Q.; Worku, M.; Ma, B. Highly Efficient Eco-Friendly X-ray Scintillators based on an Organic Manganese Halide. Nat. Commun. 2020, 11, 4329.

[6] Gandini, M.; Villa, I.; Beretta, M.; Gotti, C.; Imran, M.; Carulli, F.; Fantuzzi, E.; Sassi, M.; Zaffalon, M.; Brofferio, C.; Manna, L.; Beverina, L.; Vedda, A.; Fasoli, M.; Gironi, L.; Brovelli, S. Efficient, Fast and Reabsorption-Free Perovskite Nanocrystal-based Sensitized Plastic Scintillators. Nat. Nanotechnol. 2020, 15, 462-468.

[7] Luo, D.; Chen, Q.; Gao, Y.; Zhang, M.; Liu, B. Extremely Simplified, High-Performance, and Doping-Free White Organic Light-Emitting Diodes Based on a Single Thermally Activated Delayed Fluorescent Emitter. ACS Energy Lett. 2018, 3, 1531-1538.

[8] Ding, D.; Wang, Z.; Li, C.; Zhang, J.; Duan, C.; Wei, Y.; Xu, H. Highly Efficient and Color-Stable Thermally Activated Delayed Fluorescence White Light-Emitting Diodes Featured with Single-Doped Single Emissive Layers. Adv. Mater. 2020, 32, No. 1906950.
[9] Sun, J.; Zhang, J.; Liang, Q.; Wei, Y.; Duan, C.; Han, C.; Xu, H. Charge-Transfer Exciton Manipulation Based on Hydrogen Bond for Efficient White Thermally Activated Delayed Fluorescence. Adv. Funct. Mater. 2020, 30, 1908568.
[10] Wang, J.-X.; Zhang, H.; Niu, L.-Y.; Zhu, X.; Kang, Y.-F.; Boulatov, R.; Yang, Q.-Z. Organic Composite Crystal with Persistent Room-Temperature Luminescence Above 650 nm by Combining Triplet-Triplet Energy Transfer with Thermally Activated Delayed Fluorescence. CCS. Chem. 2020, 2, 1391-1398.
[11] Yang, Z.; Mao, Z.; Xie, Z.; Zhang, Y.; Liu, S.; Zhao, J.; Xu, J.; Chi, Z.; Aldred, M. P. Recent Advances in Organic Thermally Activated Delayed Fluorescence Materials. Chem. Soc. Rev. 2017, 46, 915-1016.
[12] Hirata, S.; Sakai, Y.; Masui, K.; Tanaka, H.; Lee, S. Y.; Nomura, H.; Nakamura, N.; Yasumatsu, M.; Nakanotani, H.; Zhang, Q.; Shizu, K.; Miyazaki, H.; Adachi, C. Highly Efficient Blue Electro-luminescence based on Thermally Activated Delayed Fluorescence. Nat. Mater. 2015, 14, 330-336.
[13] Jeon, S. O.; Lee, K. H.; Kim, J. S.; Ihn, S.-G.; Chung, Y. S.; Kim, J. W.; Lee, H.; Kim, S.; Choi, H.; Lee, J. Y. High-Efficiency, Long-Lifetime Deep-Blue Organic Light-Emitting Diodes. Nat. Photonics 2021, 15, 208-215.

What is claimed is:

1. An X-ray imagining film that transforms X-ray radiation into visible light by scintillating, the X-ray imagining film comprising:
a substrate; and
a nanocomposite formed on the substrate,
wherein the nanocomposite includes perovskite nanosheets and plural organic chromophores that interact with the perovskite nanosheets through F—Pb bonds,
wherein the perovskite nanosheets are selected to absorb the X-ray radiation and emit first light centered on 510 nm, and the plural organic chromophores are selected to absorb second light between 400 and 600 nm, with a peak at 510 nm, and emit the visible light in 500 to 800 nm range.

2. The X-ray imagining film of claim 1, wherein there are two F—Pb bonds between each organic chromophore and a corresponding perovskite nanosheet.

3. The X-ray imagining film of claim 1, wherein the perovskite is $CsPbBr_3$.

4. The X-ray imagining film of claim 3, wherein the organic chromophore is difluoroboron 1,3-diphenylamine β-diketonate.

5. The X-ray imagining film of claim 1, wherein a distance between a perovskite nanosheet and an organic chromophore of the plural organic chromophores is about 1 nm.

6. The X-ray imagining film of claim 1, further comprising:
a polymer material that encapsulated the perovskite nanosheets and the plural organic chromophores.

7. The X-ray imagining film of claim 6, wherein the perovskite nanosheets and the plural organic chromophores are uniformly distributed within the polymer material.

8. The X-ray imagining film of claim 1, wherein a weight by percentage of the plural organic chromophores is about 2% relative to a total mass of the nanocomposite.

9. The X-ray imagining film of claim 1, wherein the plural organic chromophores are selected to have a thermally activated delayed fluorescence character.

10. The X-ray imagining film of claim 1, wherein the nanocomposite has an imagining resolution of about 135 μm.

11. A nanocomposite that transforms X-ray radiation into visible light by scintillating, the nanocomposite comprising:
perovskite nanosheets; and
plural organic chromophores,
wherein the plural organic chromophores interact with the perovskite nanosheets through F—Pb bonds, and
wherein the perovskite nanosheets are selected to absorb the X-ray radiation and emit first visible light waves centered on 510 nm, and the plural organic chromophores are selected to absorb second light waves between 400 and 600 nm, with a peak at 510 nm, and emit the visible light between 500 to 800 nm.

12. The nanocomposite of claim 11, wherein there are two F—Pb bonds between each organic chromophore and a corresponding perovskite nanosheet.

13. The nanocomposite of claim 11, wherein the perovskite is $CsPbBr_3$.

14. The nanocomposite of claim 13, wherein the organic chromophore is difluoroboron 1,3-diphenylamine β-diketonate.

15. The nanocomposite of claim 11, wherein a distance between a perovskite nanosheet and an organic chromophore of the plural organic chromophores is about 1 nm.

16. The nanocomposite of claim 11, further comprising:
a polymer material that encapsulated the perovskite nanosheets and the plural organic chromophores.

17. The nanocomposite of claim 16, wherein a weight by percentage of the plural organic chromophores is about 2% relative to a total mass of the nanocomposite and the polymer material.

18. The nanocomposite of claim 11, wherein the plural organic chromophores are selected to have a thermally activated delayed fluorescence character.

19. The nanocomposite of claim 11, wherein the nanocomposite has an imagining resolution of about 135 μm.

20. An X-ray imagining system that transforms incoming X-ray radiation into visible light, the X-ray imagining system comprising:
an X-ray source configured to generate first X-rays; and
an X-ray imagining film configured to receive second X-rays that have passed through a target and to generate an image of the target by transforming the second X-rays into the visible light by scintillation,
wherein the X-ray imagining film includes,
a substrate, and
a nanocomposite formed on the substrate,
wherein the nanocomposite includes perovskite nanosheets and plural organic chromophores that interact with the perovskite nanosheets through F—Pb bonds,
wherein the perovskite nanosheets are selected to absorb the second X-ray radiation and emit first light waves centered on 510 nm, and the organic chromophores are selected to absorb second light waves between 400 and 600 nm, with a peak at 510 nm, and emit the visible light in 500 to 800 nm range.

* * * * *